Sept. 15, 1970  C. A. BEST  3,529,280
BATTERY GROUNDING DEVICE
Filed Aug. 5, 1968
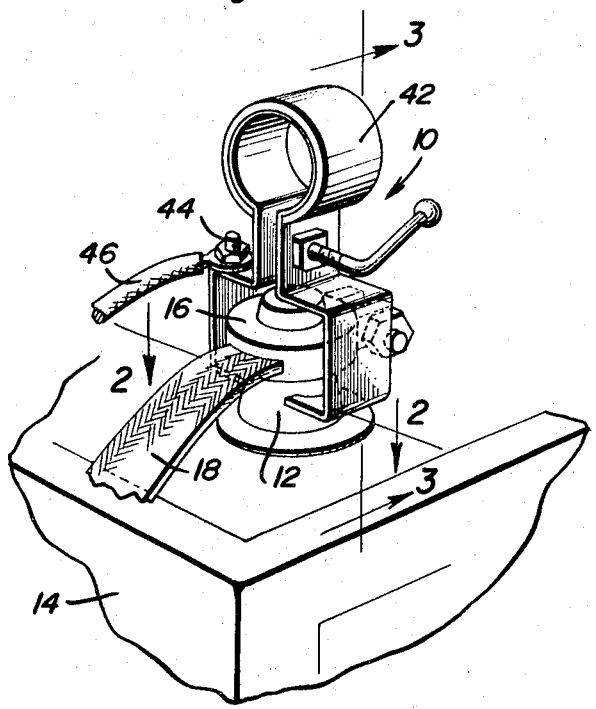
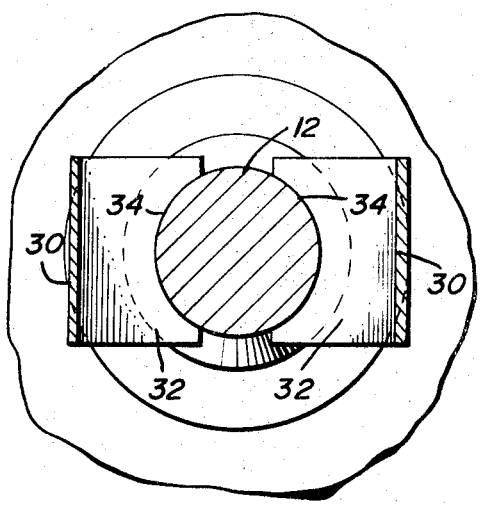
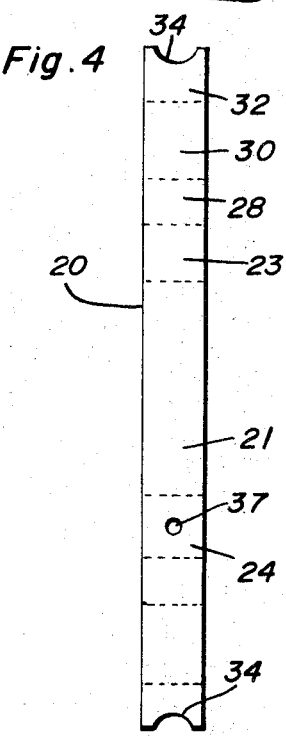
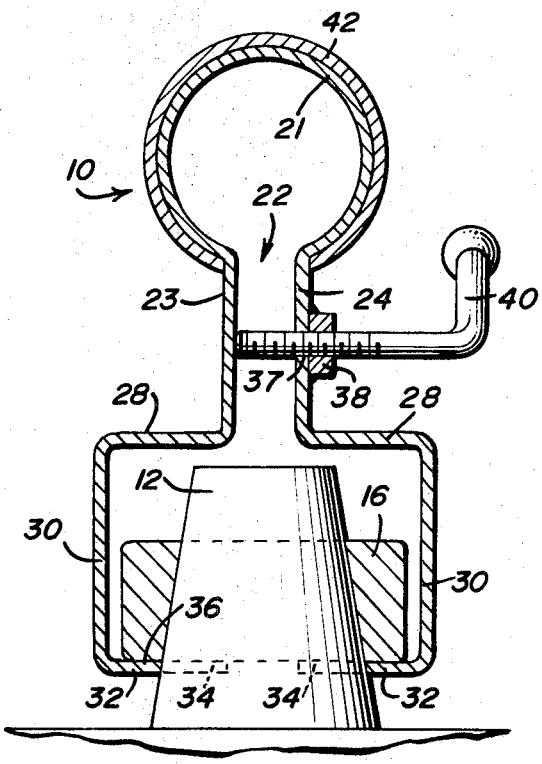
Clarence A. Best
INVENTOR.

United States Patent Office 3,529,280
Patented Sept. 15, 1970

3,529,280
BATTERY GROUNDING DEVICE
Clarence A. Best, Box 341, New Albany, Ind. 47150
Filed Aug. 5, 1968, Ser. No. 750,050
Int. Cl. H01r 11/26
U.S. Cl. 339—226    1 Claim

ABSTRACT OF THE DISCLOSURE

A spring-loaded conductive clamp adapted for mounting on a battery post. Adjustment means are provided for selectively retaining the clamp jaws in a separated position while the clamp is positioned on a battery post. A terminal is provided on the body of the clamp to permit the connection of an electrical cable thereto.

---

The present invention relates to clamps and more particularly to a vehicle battery clamp.

It is a common occurrence for car owners to experience hard starting of their automobiles due to a poor connection between a battery cable clamp and an associated battery post. Many times, this is due to a corrosive interface between the clamp and post which not only reduces the conductivity therebetween but prevents the removal of the battery clamp without loosening or pulling out the post from the battery housing.

The present invention is a spring-loaded clamp device which may be mounted upon a battery post encumbered by a corrosively attached cable clamp. The inventive clamp includes a terminal for attaching a jumper cable thereto and effectively jumping the previously installed and nonconducting battery cable. Thus, the principal advantage of the present invention resides in the ability of a vehicle owner to utilize an installed battery for an extended period of time where such a battery would otherwise require replacement.

A further use of the present invention, in allowable instances, resides in the fact that the clamp may be positioned so that the jaw members abut the undersurface of a corrosively attached battery terminal so that a conductive path is created between an exposed portion of the battery post and the main body portion of an associated battery clamp cable through the clamp device. A still further advantage of the present invention is the capability of the clamp to be quickly mounted upon a battery post without the use of tools. This capability renders the invention an expedient in emergency situations where electrical contact between a battery cable clamp and an associated post has been terminated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the present clamp device as installed on a battery.

FIG. 2 is a horizontal cross-sectional view taken along a plane passing through section line 2—2 of FIG. 1.

FIG. 3 is a vertical cross-sectional view illustrating the component portions of the present clamp device and is taken along a plane passing through section line 3—3 of FIG. 1.

FIG. 4 is a generally rectangular strip of metal including the contours and bends therein prior to the forming of a clamp device therefrom.

Referring specifically to the drawings and more particularly to FIGS. 1 and 3, reference numeral 10 generally denotes the present clamp device and as will be seen is mounted upon a grounded battery post 12 of a vehicle battery 14. As previously explained, the present clamp device is generally utilized when a previously installed battery cable clamp 16 becomes corrosively attached to battery post 12. In the particular illustration shown in FIG. 1, a ground cable 18 is shown connected to battery cable clamp 16. However, as will be appreciated, although battery post 12 represents the ground terminal of battery 14, the present invention may be utilized in conjunction with the non-grounded battery terminal as well.

FIG. 4 illustrates a generally rectangular strip of metal 20 from which the clamp device 10 is fabricated. Fabrication of the device preferably includes the formation of several bends along the strip which facilitate the deformation of the strip 20 to the final clamp device form. The specific structure of the clamp device is clearly shown in FIG. 3 and is seen to include a horizontally oriented cylindrical portion 21 having a longitudinal gap formed within the cylindrical wall 21 and is denoted by 22. Rectangular flange portions 23 and 24 integrally append from the cylindrical portion 21 at the gap formed therein. For purposes of description, the cylindrical portion 21 and integrally connected flange portions 23 and 24 have a transverse cross-section generally resembling the contour of an inverted Florence flask. The lower edge portions of the flanges 23 and 24 are integrally connected to horizontally oriented rectangular flange portions 28 which continue at their outward edges to integrally connected rectangular flange portions 30 oriented perpendicularly to the flange potrions 28 and extending in an opposite direction from flange portions 23 and 24. The lower edges of the flange portions 30 are integrally connected to inwardly turned horizontal flange portions 32 which extend inwardly toward one another but are maintained at the innermost edges thereof in spaced relation. As particularly illustrated in FIG. 2, these inwardly confronting edges 34 are characterized by semi-circular contours. It is noted that these edges may be fabricated as knife or cutting edges which would permit the piercing of a battery post to establish greater conductivity.

Attention is invited to FIG. 3 which illustrates the positioning of the clamp device 10 so that the upper surface of the jaw members 32 are maintained in abutting relation with the undersurface of the battery cable clamp 16, the abutting surfaces or interface being denoted by 36.

An aperture 37 is centrally formed within flange portion 24 and a nut 38 is suitably soldered in spaced coaxial relation with the aperture. A bolt member 40 has its threaded end inserted within nut 38 and passes through associated aperture 37 for contact with the interior surface of flange portion 23. As noted in FIGS. 1 and 3, the opposite end of the bolt member is perpendicularly deformed to form a crank handle.

In order to urge the jaw members 32 inwardly toward one another, a split sleeve spring member 42 is slipped over the cylindrical clamp device portion 21. The longitudinal edges of the split sleeve member 42 abut the outward surfaces of the flange portions 23 and 24 thereby urging the same toward one another which commensurately results in the urging of the jaw members 32 toward one another.

In operation of the device, the bolt member 40 is screwed inwardly to cause separation of the jaw members 32 which in turn permits the mounting of the clamp device over the battery cable clamp 16. Once properly positioned, the bolt member 40 is backed-off so that clamping action is effectuated.

Referring to FIG. 1, it will be noted that a binding post or terminal 44 is connected to one of the flange portions 28 thereby permitting the connection of a jumper cable 46 thereto. The opposite end of cable 46 includes a suitable connector (not shown) such as an alligator clip which permits the attachment of that end to a suitable vehicular connection point to complete the battery circuit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A conductive clamp device having jaw members, opposing flange portions connected to said jaw members, a spring portion connected to said flange portion for urging said jaw members together, a resilient sleeve embracing the spring portion for assisting in urging said jaw members together, adjustment means operatively connected to a first flange portion for selectively bearing against a second flange portion and causing relatively outward displacement thereof as well as commensurate spreading of said jaw members, said first flange portion including an aperture therein, said adjustment means including a bolt member passing through said aperture perpendicular to said first flange portion, said bolt member having a first end for bearing against said second flange portion, said bolt member also having a second end portion formed perpendicularly to the first end portion and serving as a handle for the bolt member, terminal means attached to one of said flange portions for permitting the connection of an electrical cable thereto, said jaw members being adapted for encircling engagement with a terminal post.

References Cited

UNITED STATES PATENTS

| | | |
|---|---|---|
| 1,686,842 | 10/1928 | Bullivant. |
| 2,285,545 | 6/1942 | Wagner et al. _____ 339—228 |
| 2,431,092 | 11/1947 | Tieman _____ 339—226 |
| 2,816,194 | 12/1957 | Staskowski _____ 200—133 |
| 3,004,239 | 10/1961 | Devino _____ 339—226 |
| 3,008,114 | 11/1961 | Adkins _____ 339—32 |
| 3,383,646 | 5/1968 | Otto _____ 339—226 |

MARVIN A. CHAMPION, Primary Examiner

J. H. McGLYNN, Assistant Examiner

U.S. Cl. X.R.

339—95, 228